United States Patent [19]

Levy

[11] Patent Number: 4,549,187

[45] Date of Patent: Oct. 22, 1985

[54] METALLIC COATED AND LUBRICATED AMORPHOUS SILICA YARN USED AS A MESH ANTENNA REFLECTOR

[75] Inventor: Donald J. Levy, Mt. View, Calif.

[73] Assignee: Lockheed Missiles & Space Company, Inc., Sunnyvale, Calif.

[21] Appl. No.: 365,192

[22] Filed: Apr. 5, 1982

[51] Int. Cl.⁴ ........................ H01Q 1/36; B01D 39/08

[52] U.S. Cl. ........................ 343/897; 57/249; 57/250; 57/901; 428/381; 428/388; 428/389

[58] Field of Search ............... 343/840, 897, 912, 915; 428/373, 378, 381, 388, 389; 57/249, 250, 258, 901

[56] References Cited

U.S. PATENT DOCUMENTS

| | | | |
|---|---|---|---|
| 2,797,469 | 7/1957 | Kahn | 57/249 |
| 3,969,731 | 7/1976 | Jenkins et al. | 343/840 |
| 4,030,103 | 6/1977 | Campbell | 343/897 |
| 4,243,715 | 1/1981 | Gordon | 428/388 |
| 4,320,403 | 3/1982 | Ebneth et al. | 343/897 |

*Primary Examiner*—Eli Lieberman

*Attorney, Agent, or Firm*—Richard H. Bryer

[57] ABSTRACT

This invention relates to an antenna material and more particularly to an antenna material comprising, in its preferred embodiment, a woven mesh of amorphous silica fibers, a conductive metal coating on at least the outer surfaces of the mesh and a lubricant covering and adhering to non-metallized surfaces of the silica fibers.

10 Claims, 1 Drawing Figure

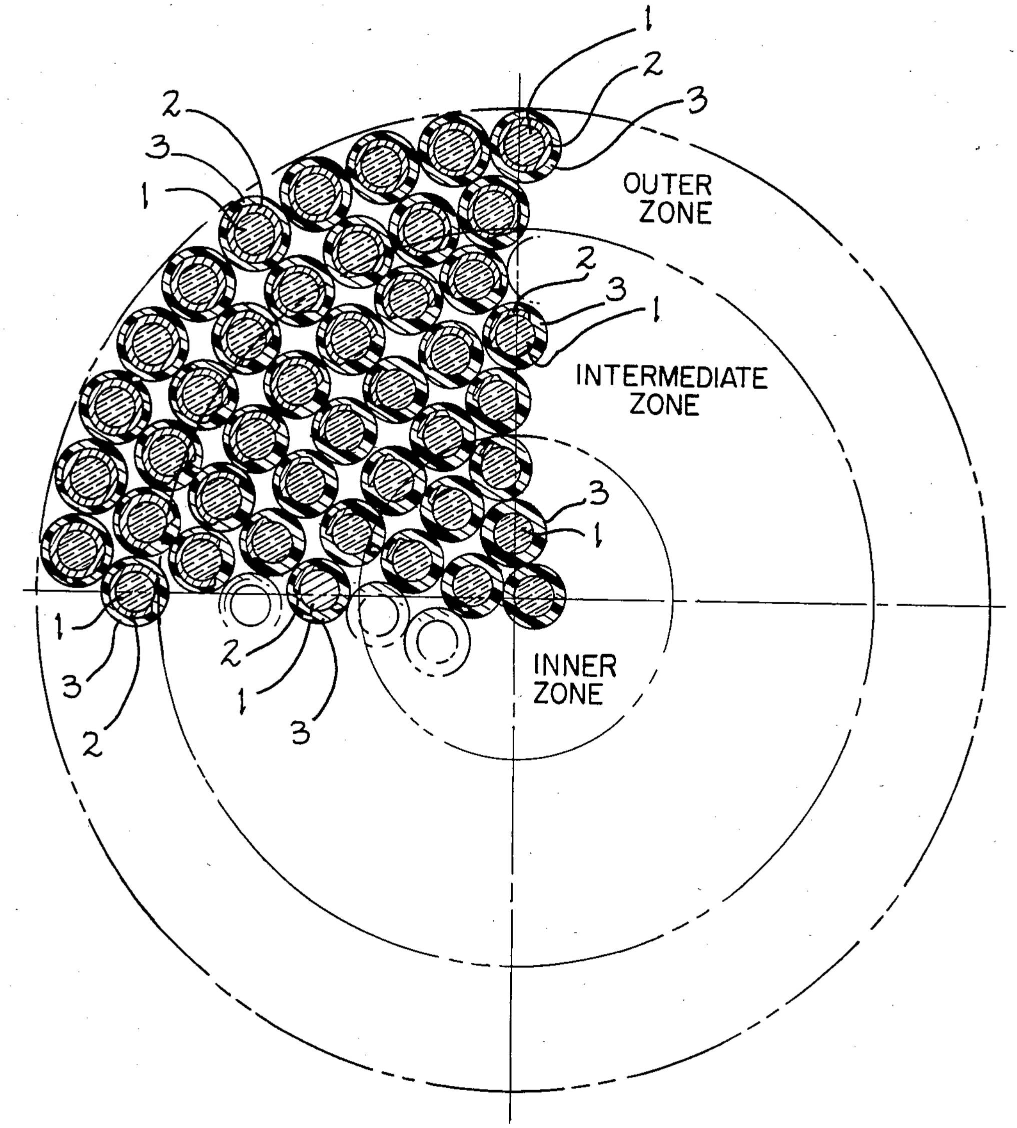
1
2
3
2
3
1
OUTER
ZONE
2
3
1
INTERMEDIATE
ZONE
3
1
1
3
2
2
1
3
INNER
ZONE

METALLIC COATED AND LUBRICATED AMORPHOUS SILICA YARN USED AS A MESH ANTENNA REFLECTOR

TECHNICAL FIELD

This invention relates to a lightweight, flexible, low-expansion antenna material having particular utility for use as an antenna reflector.

BACKGROUND ART

This invention relates to an antenna material for use as an antenna reflector and has particular utility for large antennas in outer space. It is well known that antenna reflectors up to a kilometer in diameter will be needed for the coming generation of spacecraft and space platforms. Unfortunately, the requirements for dimensional stability of the antenna shape become more stringent as the antenna size or frequency increases in order to prevent degradation of antenna performance.

One of the principal causes of antenna shape distortion is thermal expansion and contraction. Antenna materials exposed to direct sunlight reach temperatures of 100° C. or more but these temperatures will then decrease to −180° C. or less when the material is shaded. Such thermal excursions are normal in the space environment and they cause radical changes in the shape and performance of antenna reflectors made from common materials.

The reflective surface of spacecraft antennas is often constructed of woven or knitted wires or metallized polymeric yarns. An open mesh type of structure achieves a low mass/area ratio and reduces overall antenna weight. Mesh materials which have been used on spacecraft antennas include gold plated molybdenum wire and copper coated polyester yarns. While these materials have been satisfactory for parabolic antennas up to 9 meters in diameter, their coefficient of thermal expansion (CTE) is excessive for the coming generation of very large antennas. The CTE of molybdenum and polyester is $9\times10^{-6}$/° C. and $60\times10^{-6}$/° C. respectively.

In addition to being lightweight and strong, other requirements for antenna mesh are good flexibility and durability. Antennas are stowed in a swell volume container and then deployed in space. Stowage causes sharp bends and high crush loads on the fabric which can cause work-hardening and kinking of metal fibers and debonding of metal coatings from polymeric yarns. Both metal and polymer yarns stretch under load by the phenomena called creep. Polymeric yarns lose strength and become brittle with age, and the process is accelerated if cracks in the metal coating expose the yarn to ultraviolet radiation from the sun. Other disadvantages of polymer yarns include low thermal stability and moisture absorption/desoprtion which affects dimensions during terrestrial handling. There is a definite need for antenna materials with improved durability and dimensional stability.

DISCLOSURE OF INVENTION

Briefly, in accordance with the invention, there is described an antenna material having a low coefficient of thermal expansion, high strength, high thermal stability, good durability and exhibiting no creep, no moisture absorption and no degradation by radiation.

More particularly, the material comprises a substrate of amorphous silica fibers in a mesh configuration, a metal coating of relatively high electrical conductivity substantially covering at least the outer surfaces of the mesh substrate and a lubricant covering and adhering to non-metallized surfaces of the silica fibers.

Illustrative of the amorphous silica substrate is a mesh of continous filament yarn produced by J. P. Stevens & Co., New York, New York and marketed under the trade name Astroquartz. Preferred metal coatings are gold, silver, copper and aluminum. Conventional lubricants, such as petroleum oil are suitable for terrestrial use of the antenna material but only when a surfactant (wetting agent) is utilized to ensure bonding of the metal coating to the fibers. However, known lubricants with a surfactant have been found to be unsuitable when the antenna material is to be utilized on a spacecraft or space structure with optical instruments. For this purpose it has been determined that the lubricant must have very low volatility and that any volatile portion be largely noncondensible. Conventional lubricants do not possess these properties. A fluorinated polyether (FPE), which by itself meets the volatility and condensibility requirements but has inadequate lubricity properties, was found to be an effective lubricant for space use as well as terrestrial use when combined with a surfactant. For the purposes of this discussion, therefore, lubricants are defined to mean both liquids that by themselves posses lubricating properties and liquids which have lubricating properties only when combined with a surfactant.

BRIEF DESCRIPTION OF THE DRAWING

The invention may be more easily understood from the following description and accompanying drawing which is an illustrative single silica yarn comprising a multiplicity of continuous-length silica filaments or fibers which are metallized and lubricated in accordance with the invention.

BEST MODE FOR CARRYING OUT THE INVENTION

Referring more particularly to the drawing, there is shown a cross-section of a single silica yarn whose fibers are metallized and lubricated in accordance with the invention.

Silica yarns supplied by manufacturers are typically 0.006 inches in diameter and consist of 120 continuous-length silica filaments or fibers each 0.004 inches in diameter. In practice, two to ten yarns may be twisted together and used as a heavier ply. Several plies may also be twisted together before weaving or knitting.

Due to the relatively close packing of fibers in the yarn, metallization of the yarn results in an incomplete metal coating around the fibers in the intermediate zone of the yarn and essentially no metal coating around the fibers in the inner zone of the yarn. Without applicant's lubricant on at least the non-metallized fiber surfaces, a significant degarding of properties result by flexure.

After metallization of the yarn depicted in the drawing, fibers in the outer zone of the yarn are generally completely coated by metal 2; fibers 1 in the intermediate zone of the yarn are only partially covered by metal 2; and fibers 1 in the inner zone of the yarn are generally void of metal 2. In accordance with the invention, at least all non-metallized surfaces of fibers 1 are coated with lubricant 3.

Amorphous (fused) silica has the very desirable low coefficient of thermal expansion (CTE) that is essential for large antennas used in space. The CTE of amorphous silica changes with temperature. It is slightly negative ($-0.29\times10^{-6}/°$ C.) with increasing temperature to about $-100°$ C. after which it becomes slightly positive ($0.34\times10$ /C.). However, the average CTE of amorphous silica fibers over the range of $-180°$ C. to 60° C. is a very low $0.11\times10^{-6}/°$ C. Other desirable properties of amorphous silica yarns are the absence of creep, moisture absorption and degradation by electromagnetic radiation together with good thermal stability, strength/weight ratio and durability.

Amorphous silica fibers have excellent strength. However, amorphous silica is a brittle material and the surface damage caused by two silica fibers rubbing against one another without lubrication will cause rapid failure in tension. Therefore, it is common practice for the fiber manufacturer to preserve the strength of amorphous silica yarn and improve flexibility or softness by impregnating it with lubricants containing such material as starch, oil, glycol and the like. Such lubricants must be removed from the yarn or fabric prior to metallization. Cleaning can be accomplished by solvents, thermal treatment in air or both. Cleaning of the silica surface must be thorough and complete so that a strong bond can be formed between the silica and a subsequent metal coating. Strong bonding is essential for a durable antenna mesh material.

The mill-lubricated mesh as received from the manufacturer is strong and supple. Absence of the lubricant causes tensile strength to be reduced drastically, however. For example, the strength of bare, mill-lubricated, leno-wave Astroquartz #594 is 6.1 N/mm (fill yarns). After the mesh is heat-cleaned in air overnight at 380° C. to remove the lubricant, the tensile strength is only 2.8 N/mm which is a strength retention of only 46 percent.

Upon metallization of the silica mesh, the metal coating will cover the surface of exposed fibers but usually does not cover all of the surface of fibers in the center of the yarn. These bare silica surfaces must be lubricated to avoid loss of tensile strength. Table 1 shows that the fill yarns of clean mesh have poor strength retention compared to the mill-lubricated mesh. Strength retention is improved somewhat by the use in Group A of typical lubricants such as a #3 paraffinic mineral oil, silicone oil and stearic acid with a silane coupling agent but these are still relatively ineffective lubricants. However, it was discovered that small quantities of a surface active chemical (surfactant) will bond the lubricant to the silica surface. The effectiveness of these lubricants with a very small quantity of the surfactant octyl-phenoxy-ethanol added is shown in the Group B data.

TABLE 1

Effectiveness of Lubricants for Strength Retention of Silica Mesh

| Lubricant | UTS (N/mm) | Strength Retention (%) |
|---|---|---|
| Mill-Lubricated | 6.1 | 100 |
| None (clean) | 2.8 | 46 |
| Group A | | |
| 6% white oil #3 | 4.5 | 74 |
| 11% silicone oil | 4.0 | 65 |
| 0.1% silane + 1.6% stearic acid | 3.2 | 52 |
| Group B (Surfactant added) | | |
| 6% white oil #3 | 5.4 | 89 |
| 5% silicone oil | 5.2 | 85 |
| 0.1% silane + 0.7% stearic acid | 4.5 | 74 |

The amount of lubricant applied to the mesh in Table 1 is shown as a percent by weight of silica mesh. A large excess was used in several cases to assure ample opportunity for the lubricant to be effective. This table shows that several common lubricants by themselves are not very effective for lubricating silica mesh, but in combination with a surfactant they are quite effective.

One portion of a surfactant molecule is hydrophylic and another portion is hydrophobic. There are a large number of surfactant compositions commercially available and their degree of hydrophyllic and hydrophobic characteristics varies. Surfactants are also available in solid or liquid form. For the purpose of this invention, it is necessary that the surfactant have adequate solubility in the lubricant selected. When applying a very small amount of lubricant to the mesh, a more uniform distribution of the lubricant on the surface of the silica fibers can be achieved by contacting the mesh with a dilute solution of lubricant in a volatile solvent such as Freon TF. In this case, the surfactant must also be soluble in or miscible with the volatile solvent. Subsequent evaporation of the volatile solvent carrier leaves a uniform film of surfactant-containing lubricant on the silica surfaces. The composition and amount of a surfactant that is required to transform a liquid into an effective lubricant for silica mesh can be determined by routine experimentation.

Group B lubricants in Table 1, even with a surfactant, are effective only for terrestrial purposes, however. They are not suitable for use in space because of their volatility in the space vacuum and subsequent condensation on critical optical surfaces of spacecraft instruments during transport or use of the antenna. Even the relatively nonvolatile silicone oils are not suitable for use on spacecraft. The requirements for a lubricant used on spacecraft with critical optical surfaces are less than 1 percent weight loss and less than 0.1 percent vacuum condensible material (on a 25° C. cold plate) when heated at 126 C. for 24 hours in a vacuum of $10^{-5}$ TORR. The conventional lubricants, with a surfactant added, do not meet these volatility requirements.

There are many known liquids with low vapor pressure. However, it is necessary to determine by routine experimentation whether any meet the very low volatility and condensibility requirements set forth above. One substance found to meet the strict specification is a liquid known as Brayco 815Z (Bray Oil Co., El Monte, Calif.) and composed of a fluorinated polyether (FPE). It has very little lubricity properties for silica mesh when used alone. However, as shown in Table 2, it becomes very effective when used in combination with a small quantity of a surfactant.

The surfactants listed in Table 2 and designated by "X" are octyl-phenoxy-ethanols in which the $C_9$ alkyl group is a mixture of branched-chain isomers and the number following "X" indicates the average number of ethylene oxide units in the ether side chain. The amount of dissolved surfactant is effective in the range from trace (0.01 percent) to 1 percent or more of the silica weight.

TABLE 2

Effectiveness of Surfactant in FPE

| | UTS (N/mm) | Strength Retention (%) |
|---|---|---|
| FPE only | 2.9 | 48 |
| 12% FPE + trace X-10 | 4.9 | 80 |
| 1.5% FPE + 0.5% X-10 | 4.9 | 80 |

TABLE 2-continued

| Effectiveness of Surfactant in FPE | UTS (N/mm) | Strength Retention (%) |
|---|---|---|
| 0.7% FPE + 0.2% X-10 | 5.0 | 83 |
| 0.4% FPE + 0.1% X-3 | 5.0 | 83 |

Table 2 also shows a partial range of amounts of nonvolatile liquid, FPE, that effectively cover the bare fiber surface and a partial range of amounts of surfactant that cause effective bonding of FPE to the silica surface. The particular formulation for a given use is readily ascertainable by one skilled in the art.

Light weight is of utmost importance for spacecraft and space structures. This consideration dictates a practical upper limit of 12 percent by weight lubricant applied to the antenna mesh. The minimum effective lower limit of lubricant is readily ascertainable by routine experimentation. A practical lower limit is from about 0.1 to 0.2 percent by weight.

Surfactant amounts in the range of 0.01 percent (trace) to 0.1 percent by weight have been found effective, although larger amounts, for example, 1 percent or higher, are satisfactory, with the particular amount utilized being dependent upon, and readily established by, the amount of lubricant utilized.

The amount and type of lubricant to use can be determined experimentally. For example, dissolve one part by weight of FPE plus 9 parts octyl phenoxy-ethanol in 100 parts of Freon TF or other volatile solvent. Apply this lubricant to heat-cleaned silica mesh by immersion or spray. Allow the Freon solvent to evaporate. Weigh the silica before and after lubrication to determine the weight percent of lubricant applied. Adjust the amount of solvent so that only 1 percent of lubricant is applied. Compare the tensile strength of the mesh before heat cleaning with that after heat cleaning and lubrication. Generally 80 percent or more of strength retention is good and acceptable. If strength retention is not satisfactory, add more FPE lubricant or sufactant or both to the original dilute solution. If strength retention is good, try smaller amounts of lubricant and surfactant. Use near the minimum amount of lubricant that achieves good strength retention. The effectiveness of other surfactants per unit weight of silica mesh can be determined by substituting them for the octyl-phenoxy-ethanol and measuring strength retention. Likewise the suitability of other candidate lubricant liquids can be determined by substituting them for the FPE after measuring the amount of volatiles and recondensibles.

The preferred metals for rf (radio-frequency)-reflectivity are those with a high electrical conductivity. Gold, silver, copper and aluminum are the principal examples. Sufficient thickness of metal should be applied to the substrate silica fibers so that the metallized mesh surface has a surface electrical resistivity of less than about 2 ohms per square. Resistivity in the range of 0.1 to 1 ohms per square is preferred. Lower values will function as well or better but will increase weight and cost. Metallization may be applied to the fibers before or after fabrication into a mesh. The mesh may be either woven or knitted, although the former is better for dimensional stability.

Techniques for forming strong metal-silica bonds are well known. One method is to apply a thin bonding layer of a metal that intrinsically adheres well to silica. For example, titanium or chromium can be deposited onto the silica and then the desired metal coating applied over the bonding layer. Molybdenum-manganese alloy adheres very strongly to silica surfaces and could be used as a bonding layer. Another technique is to apply fluxes to the silica surface before or with the desired metal coating. For example, it is well known that the oxides of bismuth, tin, vanadium and similar elements are excellent fluxes and enhance the bonding of metals to silica.

A coating solution can be prepared by dissolving an organogold compound such as gold sulforesinate in an organic solvent and adding small quantities of organo compounds of bismuth, tin, vanadium and rhodium (which causes film continuity). When a clean silica mesh is dipped into this solution, dried and fired in air, a gold coating is strongly bonded to the surface of the silica fibers. Thin gold coatings also may be used as a bonding layer for the subsequent deposition of other rf-reflective metals such as copper and silver by inexpensive processes such as electrodeposition. Alternately, an rf-reflective gold coating can be deposited by several coats from the organogold solution or by electroplating additional gold over the initial bonding coat.

Meshes and other fabrics can be manufactured from either continuous or non-continuous (staple) silica fibers. In general, the mesh fabricated from staple yarn will be more flexible but weaker per unit weight than a similar mesh prepared from continuous-filament yarn. Either is satisfactory for antenna mesh.

It is desirable to achieve the lowest possible coefficient of themal expansion (CTE) of the mesh for space applications. Fused silica fibers with an amorphous structure exhibit a very low CTE and are commercially available for fabrication into antenna meshes. Although one such material is referred to as Astroquartz (fibers and yarn), this name is somewhat non-descriptive since the material is amorphous silica, and not quartz (a crystalline form of silica with a relatively high CTE.)

The advantage of a mesh antenna reflector compared to a sold (sheet) reflector is the lower weight. Consequently, antenna meshes are fabricated with the smallest, lightest yarns that will carry the design load. A plain weave is very desirable since the mesh has an equal and loe CTE in both axial direction of the yarns. When many yarns per centimeter are used, the mesh is mechanically quite stable. If the yarns per centimeter are decreased to diminish weight, the yarn position is more easily shifted during handling and the mesh becomes more unstable. However, the crossovers can be fixed by application of a sizing or coating. The leno weave exhibits perhaps the lowest CTE of any mesh in the fill (single yarn) direction, but the CTE in the warp (double yarn) direction is higher. This weave is often used (with the proper orientation of panels) for antenna mesh. There are innumerable knit patterns that afford strong, light, open meshes. Knits are mechanically less stiff than weaves. Each is useful in the proper circumstances.

Several examples are given to illustrate the preparation and characteristics of high-performance antenna mesh materials in accordance with the invention.

EXAMPLE 1

A piece of leno-weave, mesh was cleaned by heating in air at 375°-385° C. The clean mesh was dipped into a commercial gold resinate solution used for metallizing glass, air dried, and fired in air. Multiple coats of gold were applied until the mesh had a surface electrical resistivity of 0.3 and 0.4 ohms per square in the warp and fill direction respectively. A lubricant of 6 percent #3 white mineral oil plus 0.05 percent octyl-phenoxy-ethanol was applied. The mesh was then crushed ten times at a pressure of 2 KPa to simulate cyclic stowage and unfurling of an antenna and demonstrate durability. Examination of the silica fibers after crushing showed that the gold was adherent and none had flaked off. Surface resistivity was found to be 0.8 and 1.1 ohms per square and rf-reflectivity was excellent. The mesh has good physical durability suitable for use as a terrestrial antenna.

EXAMPLE 2

A piece of mill-lubricated, leno-weave, silica mesh was coated with multiple layers of gold by the thermal process described in Example 1 until the mesh was electrically conductive. The initial thermal treatment removed the mill lubricant and deposited the first gold layer. The mesh was then placed in a gold plating bath and electroplated until the resistivity was 0.15 and 0.5 ohms per square in the warp and fill directions respectively. The tensile strength of the non-lubricated mesh was 60 and 51 percent of the strength of mill-lubricated bare mesh in the square same respective directions. Tests of other gold-coated mesh without a lubricant showed that strength was low and in the range of 55-60 percent and 51—72 percent respectively.

EXAMPLE 3

Mill-lubricated, leno-weave, mesh has a tensile strength of 6.1 N/mm but when the lubricant was removed the strength of the cleaned mesh dropped to 38 percent of that value. When cleaned meshes were lubricated respectively with 12 percent FPE, 1.6 percent stearic acid, 11 percent silicone oil and 6 percent #3 white paraffin oil, the tensile strength was still low, in the order of 48 percent, 52 percent, 65 percent and 74 percent respectively of the mill-lubricated fill yarns. FPE was an especially poor lubricant. When meshes lubricated with stearic acid, silicone oil and #3 white paraffin oil were heated at 126 C for 24 hours in a high vaccum, it was also determined that these lubricants volatilized and condensed on surrounding surfaces. However, under the same conditions it was found that FPE exhibited less than 1 percent weight loss and vacuum condensibles on a 25° C. cold plate were less than 0.1 percent. Additionally, FPE was found to be a very effective lubricant when combined with the surfactant octyl-phenoxy-ethanol, resulting in a strength retention of fill yarns of 80 percent and more.

EXAMPLE 4

A test was conducted to compare the electrical resistivity of unlubricated copper-silica mesh with copper-polyester mesh after simulated stow/deployment cycles. The resistivity performance of the copper-silica mesh with 0.5 to 1.8 percent bonding gold was equivalent to the resistivity performance of the copper-polyester mesh which has been successfully used on NASA ATS space missions.

Panels of silica mesh were coated with a bonding layer of 0.2 to 1.8 percent gold by weight using a gold resinate solution. The panels were then plated with copper until a resistivity of less than 1 ohm per square was reached so that the material had good reflectivity. The panels were then crushed 20 times at a pressure of 0.5 kPa to determine durability.

Crushing the mesh causes sharp bends in the silica fibers and cracks in the adherent copper coating. Terrestrial oxidation within the cracks causes resistivity to increase with time but the final unfurling in space abrades the oxide and satisfactory resistivity is restored. Table 1 shows the resistivity of the panels in the warp and fill directions before crushing and the increase with time after crushing.

TABLE 1

| Time | Crust Test of Silica Mesh/Gold/Copper Surface Resistivity (ohm/square) | | | | | |
|---|---|---|---|---|---|---|
| | 0.2% | | 0.5% | | 1.8% gold | |
| (days) | warp | fill | warp | fill | warp | fill |
| 0 | 0.5 | 0.8 | 0.15 | 0.2 | 0.1 | 0.15 |
| 3 | 5 | 10 | 0.2 | 0.3 | 0.1 | 0.2 |
| 10 | 50 | 100 | 0.5 | 1 | 0.2 | 0.3 |
| 26 | 100 | 100 | 0.8 | 4 | 0.25 | 0.4 |
| 53 | 200 | 1000 | 1.2 | 4 | 0.25 | 0.4 |
| 126 | 200 | 1000 | 5 | 12 | 0.6 | 0.9 |

In a similar test of copper-coated polyester mesh that has performed satisfactorily in space, the resistivity pattern was between that of 0.5 and 1.8 percent gold when tested in accordance with the preceding. The 0.2 percent bonding gold appears to be an insufficient amount. At least 1 percent gold is needed to bond the copper rf-reflecting coating to silica mesh.

Copper-coated polyester mesh was used for thirty-foot (9 m) diameter unfurlable antenna of the NASA Application Technology satellites. This leno-weave mesh had a CTE of $22\times10^{-6}/°C.$ at temperatures lower than $-100°$ C., $5.2\times10^{-6}/°C.$ from $-100°$ C. to $-18°$ C. and $2.7\times10^{-6}/°C.$ at temperatures above $-18°$ C. in the fill (single yarn) direction. In comparison, the CTE of gold-coated silica leno mesh in the fill direction for the temperatures range $-170°$ C. to 60° C. is only $0.6\times10^{-6}/°C.$

EXAMPLE 5

Amorphous silica mesh panels were cleaned and coated with aluminum by sputtering because this method gives better coverage of complex geometries than the line of sight coverage by vacuum evaporation techniques. When the weight of aluminum was 2.8 percent of the silica mesh, electrical resistivity was still infinite. When 5.5 percent aluminum was deposited, the resistivity was 0.7 and 1.0 ohms in the warp and fill directions respectively and the mesh exhibited excellent rf-reflectivity.

I claim:

1. An antenna material comprising a plurality of amorphous silica yarns in a mesh configuration, each of said yarns consisting of a multiplicity of silica fibers, an electrtically conductive metal coating on at least the outer surfaces of said yarns and a surfactant-containing lubricant covering and adhering to at least the non-metallized surfaces of said silica fibers in said yarns.

2. A material in accordance with claim 1 wherein said conductive coating has a surface electrical resistivity of 2 ohms or less per square.

3. A material in accordance with claim 2 wherein the conductive coating is selected from the group consisting of copper, silver, gold and aluminum.

4. A material in accordance with claim 1 wherein said lubricant is a low volatility liquid whose volatile portion is largely noncondensible.

5. A material in accordance with claim 4 wherein said lubricant is a fluorinated polyether.

6. A material in accordance with claim 4 wherein said lubricant is present in an amount up to 12 percent by weight.

7. A material in accordance with claim 1 wherein said surfactant is octyl-phenoxy-ethanol.

8. A material in accordance with claim 7 wherein said surfactant is present in an amount from about 0.01 percent to about 1 percent by weight.

9. A material in accordance with claim 4 wherein said low volatility liquid has less than 1 percent weight loss and less than 0.1 percent vacuum condensible material (on a 25° C. cold plate) when heated at 126° C. for 24 hours in a vacuum of $10^{-5}$ TORR.

10. A material useful for forming an antenna mesh reflector comprising an amphorous silica yarn having a multiplicity of silica fibers, an electrically conductive metal coating on at least the outer surface of said yarn and a surfactant-containing lubricant covering and adhering to at least the non-metallized surfaces of said silica fibers in said yarn.

* * * * *